(12) United States Patent
Doumuki

(10) Patent No.: US 7,992,184 B2
(45) Date of Patent: Aug. 2, 2011

(54) HARDWARE MODULE FOR ADDING FUNCTIONALITY TO TELEVISION USING MECHANICAL AND WIRELESS LINKS

(75) Inventor: Tohru Doumuki, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 825 days.

(21) Appl. No.: 11/856,971

(22) Filed: Sep. 18, 2007

(65) Prior Publication Data

US 2009/0077607 A1   Mar. 19, 2009

(51) Int. Cl.
*H04N 7/16* (2006.01)
(52) U.S. Cl. ............... 725/141; 725/37; 725/38; 725/59; 725/120; 725/78; 725/80; 725/81; 725/82; 725/85; 725/131; 725/132; 725/133; 725/139; 725/140; 725/151; 725/152; 725/153; 348/731; 348/732; 348/734; 348/555; 348/558; 348/836; 348/838; 348/839; 348/843
(58) Field of Classification Search .......... 725/131–133, 725/139–141, 151–153, 78, 80–82, 85, 37–38, 725/59, 120; 348/836, 838–839, 843, 731–732, 348/734, 555, 558
See application file for complete search history.

(56) References Cited

U.S. PATENT DOCUMENTS

| | | | |
|---|---|---|---|
| 5,553,140 A * | 9/1996 | Kubota et al. | 380/210 |
| 5,949,493 A * | 9/1999 | Mudra et al. | 348/553 |
| 6,130,727 A * | 10/2000 | Toyozumi | 348/837 |
| 6,131,130 A * | 10/2000 | Van Ryzin | 710/6 |
| 6,381,332 B1 * | 4/2002 | Glaab | 380/210 |
| 6,665,871 B1 * | 12/2003 | Macrae et al. | 725/54 |
| 7,344,084 B2 * | 3/2008 | DaCosta | 235/472.01 |
| 7,624,417 B2 * | 11/2009 | Dua | 725/114 |
| 2002/0186329 A1 * | 12/2002 | Tong et al. | 348/839 |
| 2003/0233667 A1 * | 12/2003 | Umipig et al. | 725/152 |
| 2004/0068744 A1 * | 4/2004 | Claussen et al. | 725/81 |
| 2004/0208598 A1 | 10/2004 | Wittenberger et al. | |
| 2004/0210657 A1 * | 10/2004 | Narayanan et al. | 709/227 |
| 2005/0105007 A1 * | 5/2005 | Christian | 348/731 |
| 2006/0050184 A1 | 3/2006 | McMiller et al. | |
| 2006/0290814 A1 * | 12/2006 | Walter | 348/554 |
| 2007/0026799 A1 | 2/2007 | Wang et al. | |
| 2007/0091168 A1 | 4/2007 | Lee | |
| 2007/0180485 A1 | 8/2007 | Dua | |
| 2008/0127254 A1 * | 5/2008 | Nakajima | 725/38 |
| 2008/0212940 A1 * | 9/2008 | Tan et al. | 386/124 |

* cited by examiner

*Primary Examiner* — Jason P Salce

(74) *Attorney, Agent, or Firm* — John L. Rogitz

(57) ABSTRACT

A set-box (SBB) is advanced into a receptacle on the rear of a TV to add functionality to the TV. Digital video information is conveyed from the SBB to the TV using respective HDMI connectors on the SBB and TV that mechanically engage each other, whereas bi-directional control information is passed wirelessly between the SBB and TV.

9 Claims, 4 Drawing Sheets

HARDWARE MODULE FOR ADDING FUNCTIONALITY TO TELEVISION USING MECHANICAL AND WIRELESS LINKS

FIELD OF THE INVENTION

The present invention relates generally to hardware modules for adding functionalities to devices such as televisions, DVD players, and the like.

BACKGROUND OF THE INVENTION

When a TV receiver is developed and released, not all functionality that might ever be desired of the TV can be included or even foreseen. For example, an improved video compression paradigm requiring a complementary decoder to play the video might be introduced after a TV is sold, in which case the TV would not have the requisite decoding capability to play video transmitted in the newer compression paradigm.

While some products may possess the capability to be remotely updated via a software update, a television might not have such a capability. Furthermore, simply updating a product with software or with a new interface has shortcomings, such as not being able to accommodate industry standards for copy protection and not possessing innate mechanisms to restrict access to the interface, which is otherwise required to prevent unapproved devices from being attached to the interface.

In co-pending U.S. patent application Ser. No. 11/782,078, incorporated herein by reference, the present assignee has disposed a set back box (SBB) for upgrading with digital capability a TV having a chassis holding a TV processor, an analog TV receiver, and no digital TV receiver. The SBB includes a housing and a digital TV receiver in the housing. The digital TV receiver is connectable through a high definition multimedia interface (HDMI) cable to the TV processor so that signals on digital channels received by the SBB can be displayed on the TV. The housing of the SBB is slidably engageable with a rear of the chassis of the TV.

As recognized herein, it may be desirable to establish not only a HDMI path between the TV and SBB but also a secondary path such as a universal serial bus (USB) path to facilitate communication of, e.g., control information. As further understood herein, it is desirable to avoid forcing the end user to make multiple wired connections between components. As also recognized herein, making a single large connector with both HDMI and USB pin-outs may not be feasible due to license constraints that permit approved interfaces only.

SUMMARY OF THE INVENTION

A module is disclosed for adding functionality to a component such as a TV to be augmented. The module includes a module housing for holding components facilitating the functionality, and a high definition multimedia interface (HDMI) connector arrangement engaged with the housing and connectable to a complementary rigidly supported connector on the component for establishing a pathway for communication of digital video to the component to be augmented. A wireless transceiver on the housing is configured for bi-directional communication with a complementary transceiver on the component to augmented to facilitate handshaking communication therebetween. The functionality may be, e.g., video decoding functionality provided by the module but not by the TV.

The handshaking communication may include device discovery communication. It may also include metadata exchange. In general, the handshaking communication is communication of control data between the component and module.

The wireless transceiver can be an optical wireless transceiver or a radiofrequency transceiver. The module housing can be disposed in a receptacle on a rear of the TV. The receptacle can have an HDMI connector configured for mechanically engaging the HDMI connector arrangement on the module housing, and the TV also includes a wireless transceiver configured for communicating with the wireless transceiver of the module.

In another aspect, a system includes a TV defining a monitor, a rear opposed to the monitor, and a receptacle formed in the rear of the monitor. The TV has a digital video connector and a wireless transceiver. A module housing holds components facilitating audio-video functionality. The module housing is disposable in the receptacle, and the module housing includes a digital video connector that mechanically engages the connector of the TV when the housing is moved into the receptacle. The module housing also supports a wireless bidirectional transceiver configured for communicating with the transceiver of the TV.

In another aspect, a module is engaged with a TV to add functionality to the TV. A mechanical connection is used to communicate digital video data from the module to the TV, while a wireless connection is used to communicate bidirectional control information between the module and TV.

Thus, in some implementations bi-directional wireless communication is established in addition to an HDMI connection. This new embodiment has variations for the method of establishing contact between the SBB and TV as well as for the method of connection for both the HDMI and bi-directional wireless communication. The system eliminates the installation and use of multiple cables for proper connection between the SBB and TV and allows for flexibility in design. Further, one embodiment of the system implements a pair of HDMI connectors, one on the SBB and the other the TV, so that the connector mating is done in the same time module is slid in for installment. In this embodiment, connector cables are eliminated completely.

DETAILED DESCRIPTION OF THE PREFERRED EMBODIMENT

Figure 1:
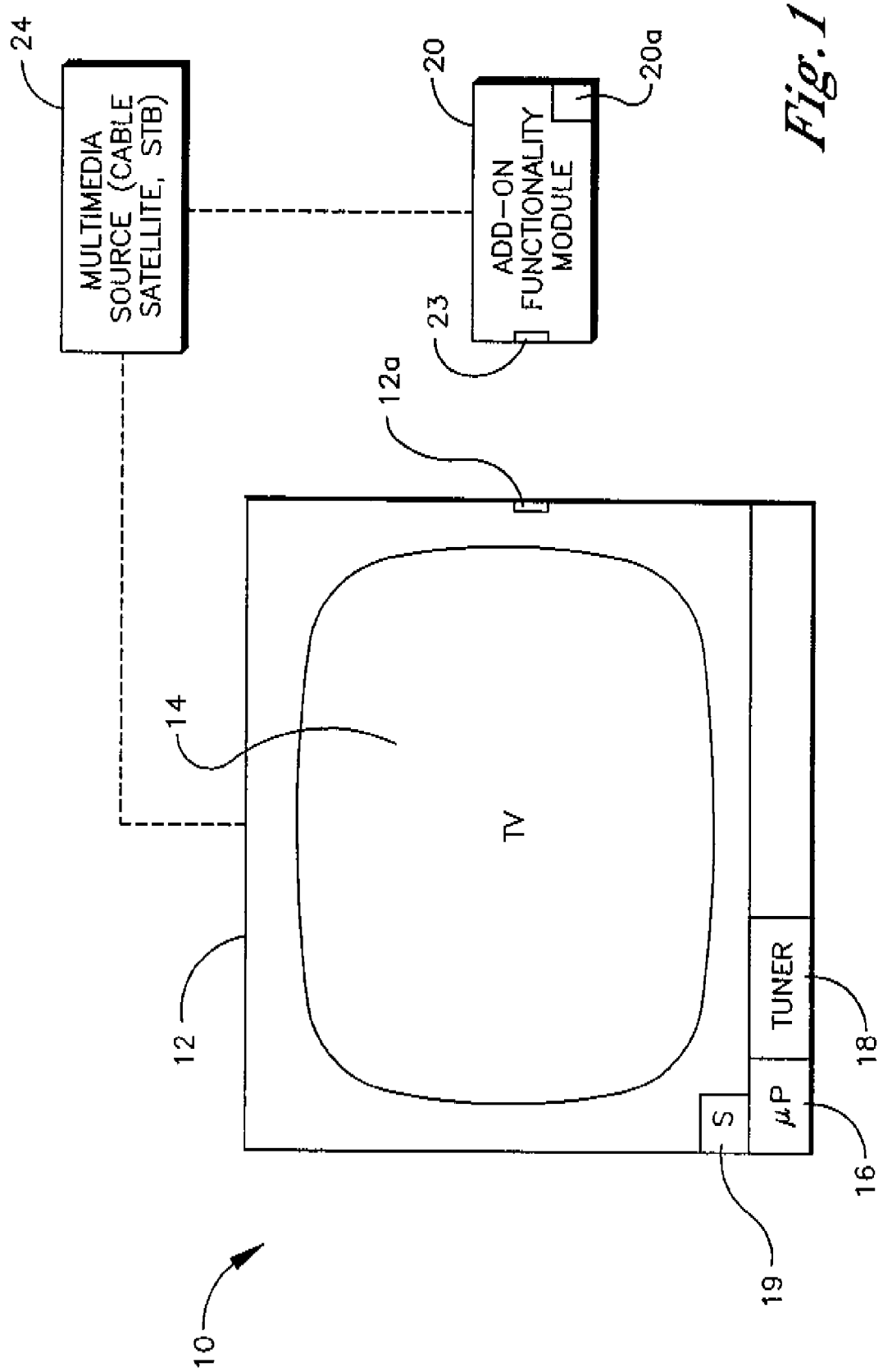
FIG. 1 is a block diagram of a non-limiting system in accordance with present principles.

Referring initially to FIG. 1, a system is shown, generally designated 10, which can include a TV 12 with video display 14 such as a flat panel matrix display or other TV display, a TV processor 16, and a TV tuner 18. The display 14 is caused by the TV processor 16 to display TV signals as selected by the TV tuner 18. Also, the TV 12 may have a data storage 19 such as but not limited to an extended display identification data (EDID) electrically erasable programmable read only memory (EEPROM). Other computer-readable media may be included or substituted, including other types of solid state memory as well as disk-based memory.

The TV 12 is also associated with one or more communication interfaces 12a. In one non-limiting implementation the interface 12a, which can be an Internet Protocol television (IPTV) receiver, codec, or other module, is a HDMI-based interface that may include hardware and software embodying a HDMI transmitter (for sending signals to a set-top box or disk player or other source) and HDMI receiver (for receiving signals from a source). Plural HDMI connectors may be provided. The interface 12a may be physically implemented within the housing of the TV 12 or it may be external thereto. The interface 12a may include its own storage such as an EEPROM or one-time programming (OTP) ROM. It is to be understood that while FIG. 1 shows various storages, the information disclosed below may be stored in one common storage or in a storage associated with only the TV 12 or only with the interface 12a. In any case, as shown the interface 12a is the communication interface between the TV 12 and an add-on functionality module 20, referred to herein as a set-back box (SBB).

More specifically, as shown in FIG. 1 an add-on functionality module 20 with internal components 20a such as circuits for facilitating the functionality can be connected to the TV 12 by a connector 12a such as a High Definition Multimedia Interface (HDMI) connector. The add-on functionality module 20 may include hardware and/or software not included in the TV 12 but desired by a user of the TV 12. For instance, the module 20 may include a video decoder or other function that is not otherwise included in the TV 12. The module 20 has an interface 23 that is complementary to the interface 12a of the TV 12.

The signals to be displayed on the TV 12 can come from a multimedia source 24 such as a set-top box, a cable head end, a satellite source, a disk player, an Internet site, etc. The multimedia source 24 may be connected to the TV 12 directly and/or to the TV 12 via the module 20 as shown.

While the above disclosure focuses on an example implementation in which the module 20 is used to augment the functionality of a TV 12, it is to be understood that the module 20 may also be used to augment the functionality of other components, e.g., set top boxes, DVD players, personal computers, etc. For example, as has been postulated in the case of a TV, a DVD player and/or a PC may not have the capability to support some new and future video and/or audio compression system. The module 20 can thus be connected to a PC or DVD to facilitate the support of a future compression algorithm.

In any case, to provide an illustration of the purpose of the module 20, if the source 24 is connected to the module 20 to deliver video that is transmitted using a compression algorithm requiring a decoder not possessed by the TV 12 to play the video, the module 20 can be provided with the decoders decode the video, and then send the decoded video to the TV 12 for playing the video.

Figure 2:
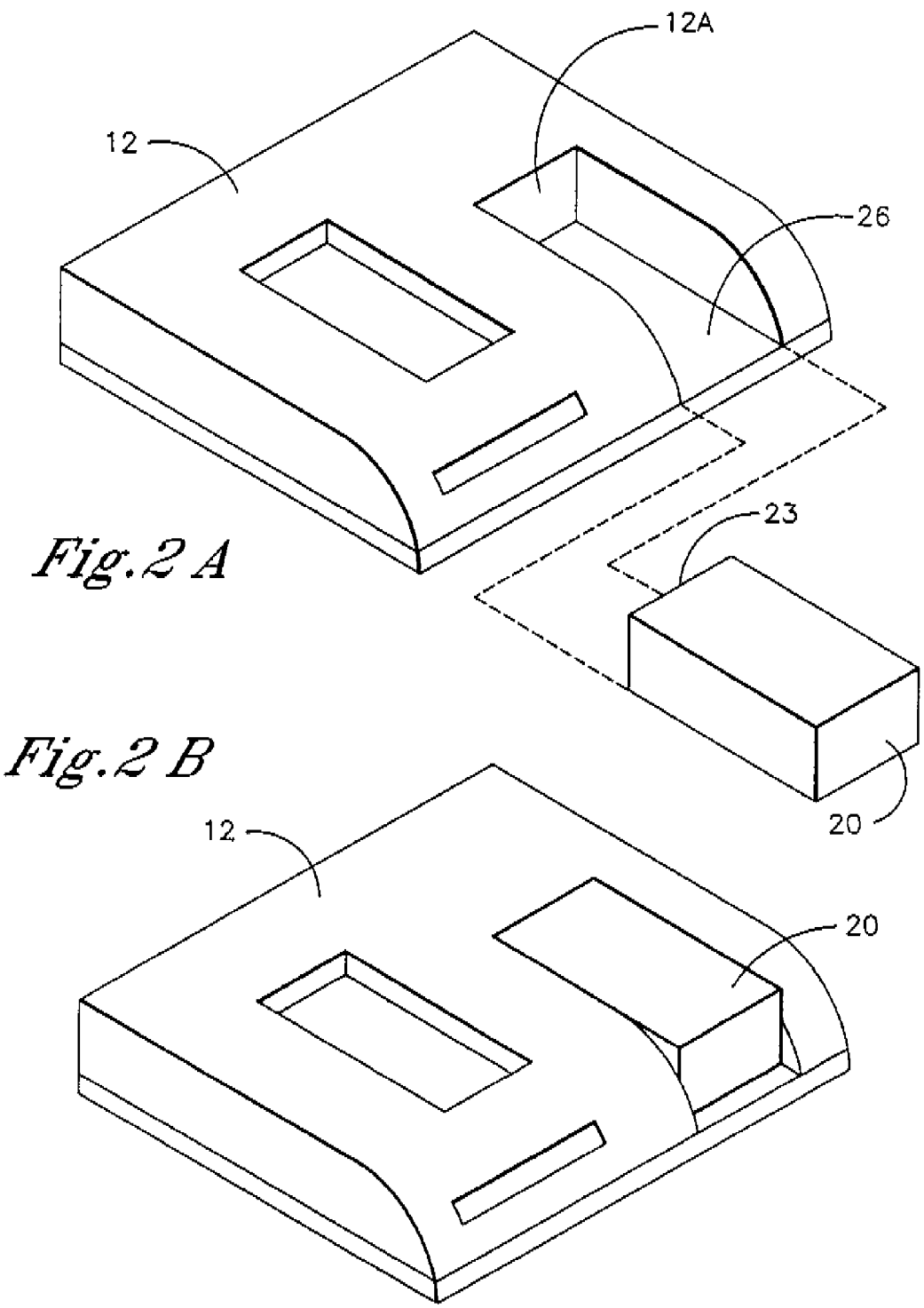
FIG. 2a is an exploded perspective view with portions cut away showing the rear of the TV chassis and the set-back box.
FIG. 2b is a view of the system in which the set back box is incorporated into the TV and direct contact/connection between the two is established.

Turning to FIGS. 2a, 2b, 3a, and 3b, a first embodiment is shown illustrating the TV 12 and the module 20, displayed in FIG. 2a with an arrow indicating the direction of incorporation of the module 20 into a complimentarily-shaped module bay 26 of the TV 12. In this instance, the module 20 slides into the bay 26, which holds an electrical interface 26 such as the HDMI connector 12a. With this structure, the HDMI connector 12a rigidly supported by the housing of the TV 12 aligns itself with the complementary rigidly supported connector 23 located on the module 20. Once the module 20 is slid into in the module bay 26, which closely receives the module 20 as shown in FIG. 2b, a pathway for communication of digital video to the TV 12 is established.

Figure 3:
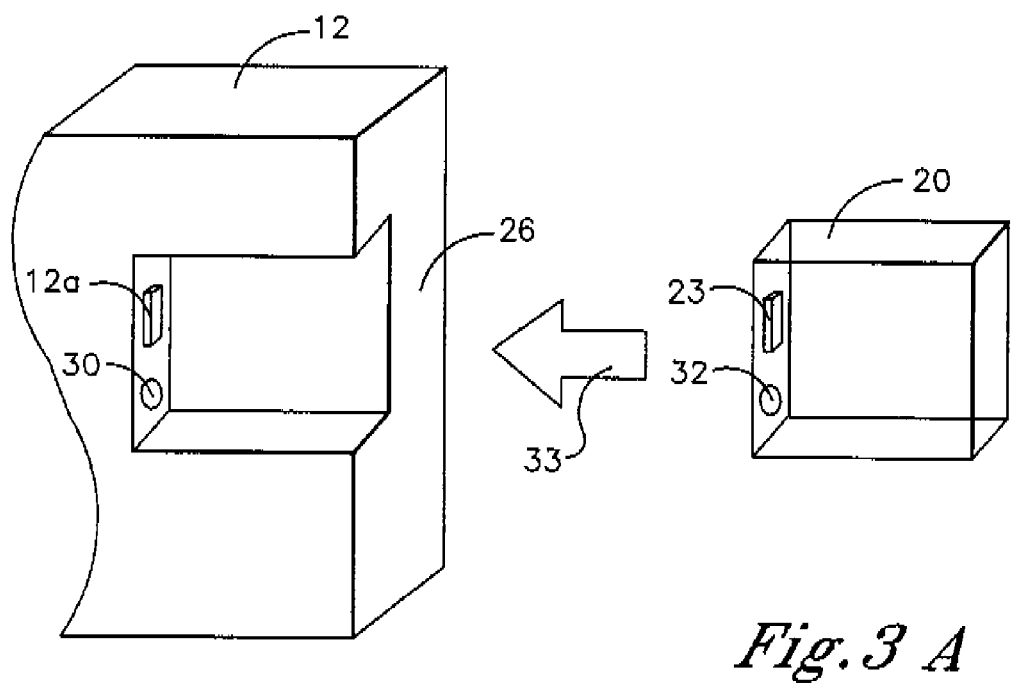
FIG. 3a is a view of the rear of a TV with HDMI and optical wireless connectors and set back box with corresponding optical wireless connector as well as HDMI connector.
FIG. 3b shows the set back box incorporated into the rear of the TV, thereby establishing HDMI and bi-directional wireless communication.
Figure 3:
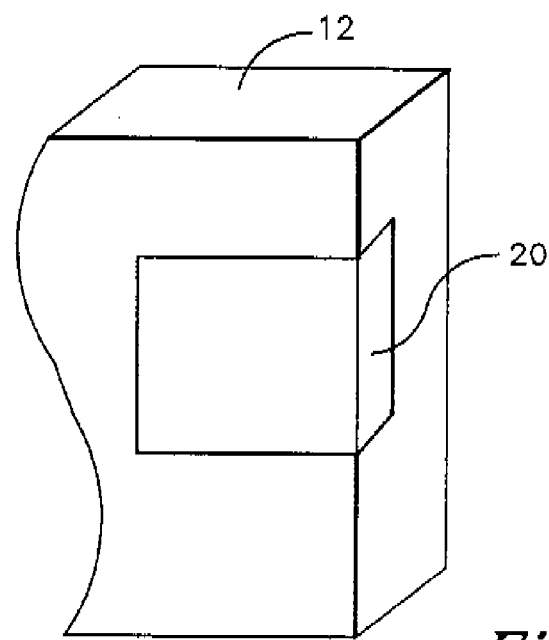

Moving to FIGS. 3a and 3b, a wireless secondary communication path between the module 20 and TV 12 may be appreciated. The module bay 26 of the TV 12 holds an optical communication receiver/transmitter 30 for wireless connection is encased in the module housing in similar fashion. An optical communication receiver/transmitter 32 for wireless connection is also shown on the housing of the module bay 26. The two wireless connectors 30, 32 are designed in the way that logical connection is established when faced each other without requiring severe alignment or physical connection. The arrow 33 indicates the direction of incorporation of the module 20 into the module bay 26.

FIG. 3b displays the module 20 incorporated into the module bay 26 of the TV 12. Although not shown in FIG. 3b, once the HDMI connector 23 of the module 20 aligns with and connects to the complimentary connector 12a of the module bay 26, a pathway for communication of digital video to the TV 12 is established. When this happens, the wireless receiver/transmitter 32 on the module 20 is in line of sight of the receiver/transmitter 30 to establish a bi-directional communication link between the module 20 and TV 12 for facilitating the exchange of handshaking communication between the TV 12 and module 20, e.g., for facilitating metadata exchange, device discovery information, authentication data, and the like.

Figure 4:
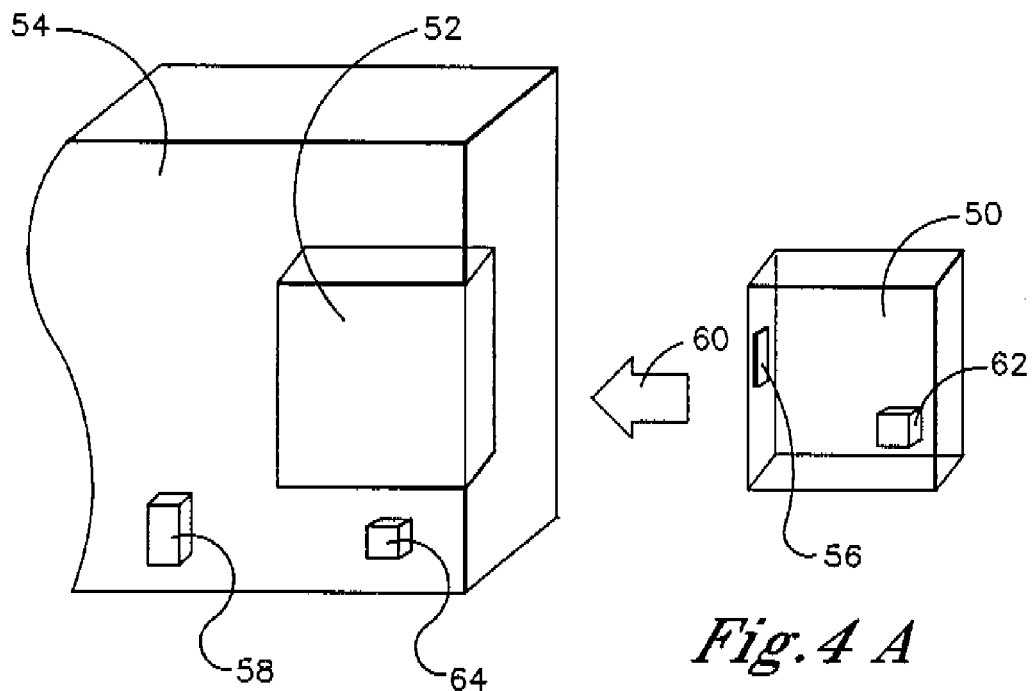
FIG. 4a is a variation of the system in which the set back box contacts the TV by an attachment base, with bi-directional wireless connection being established via Bluetooth communicators on both the set back box and TV and with the HDMI connection being established with a HDMI cable.
FIG. 4b shows yet another embodiment using a HDMI connector cable.
Figure 4:
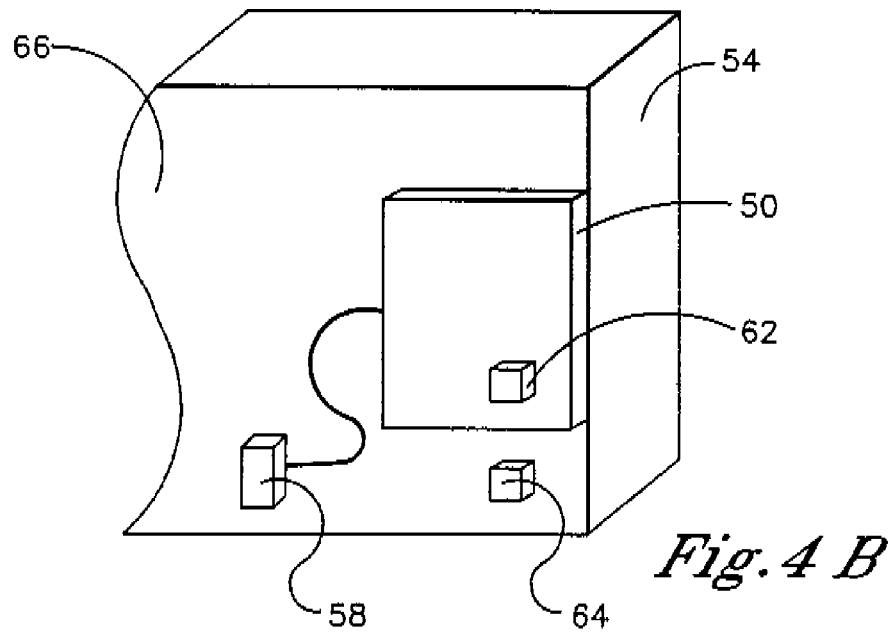

FIG. 4a displays an alternate embodiment in which a module 50 can be engaged with a module attachment base 52 of a TV 54. The module 50 is shown with its HDMI connector 56 mounted on the left side of the module housing. A corresponding HDMI connector 58 is mounted on the TV 54 housing near, or next to, the module attachment base 52. The arrow 60 indicates that the module 50 is placed on the module attachment base 52 without direct contact between the HDMI connectors 58, 56.

Also shown mounted on the module 50 housing is a variation of the wireless transmitter, specifically, a radiofrequency transmitter/receiver such as a Bluetooth transmitter/receiver 62. A corresponding Bluetooth transmitter/receiver 64 is mounted on the housing of the TV 54 preferably near, or next to, the module attachment base 52.

The module 50 is shown placed on the module attachment base 52 in FIG. 4b. The Bluetooth transmitters/receivers 62, 64 are located in proximity to one another in order to establish a bi-directional wireless communication to facilitate the above-discussed handshaking information exchange. A HDMI cable 66 can be connected to the HDMI connector 56 of the module 50 and to the HDMI connector 58 of the TV 12 to establish a pathway for communication of digital video between the two components.

Digital video protocols other than HDMI may be used. Also, wireless paths other than optical and rf may be used, e.g., ultrasonic wireless paths may be used. Moreover, more than a single wireless path may be used.

While the particular HARDWARE MODULE FOR ADDING FUNCTIONALITY TO TELEVISION USING MECHANICAL AND WIRELESS LINKS is herein shown and described in detail, it is to be understood that the subject matter which is encompassed by the present invention is limited only by the claims. For instance, a module of the invention may comprise one, two, or all of the features shown in the figures.

What is claimed is:

1. A system, comprising:
a TV defining a monitor, a rear opposed to the monitor, and a receptacle formed in the rear of the monitor, the TV having a digital video connector, the TV also including a wireless transceiver; and
a module housing for holding components facilitating audio-video functionality and disposable in the receptacle, the module housing including a digital video connector that mechanically engages the connector of the TV when the housing is moved into the receptacle, the module housing also supporting a wireless bidirectional transceiver configured for wirelessly communicating with the wireless transceiver of the TV.

2. The system of claim 1, wherein the digital video connectors are HDMI connectors.

3. The system of claim 2, wherein the HDMI connector of the module housing is rigidly supported by the housing and the HDMI connector of the TV is disposed in the receptacle, the HDMI connectors mechanically engaging each other when the module is advanced into the receptacle.

4. The system of claim 2, wherein the HDMI connector of the module housing is connected by an electrical cord to the housing.

5. The system of claim 1, wherein the functionality is video decoding functionality provided by the module but not by the TV.

6. The system of claim 1, wherein the wireless transceivers exchange device discovery communication.

7. The system of claim 1, wherein the wireless transceivers exchange metadata exchange.

8. The system of claim 1, wherein the wireless transceivers are optical wireless transceivers.

9. The system of claim 1, wherein the wireless transceivers are radiofrequency transceivers.

* * * * *